(12) United States Patent
Riegger et al.

(10) Patent No.: US 9,841,273 B2
(45) Date of Patent: Dec. 12, 2017

(54) OPTICAL MEASURING PROBE AND METHOD FOR OPTICALLY MEASURING INNER DIAMETERS

(71) Applicant: Robert Bosch GmbH, Stuttgart (DE)

(72) Inventors: Peter Riegger, Korntal-Muenchingen (DE); Gerald Franz, Backnang (DE); Pawel Drabarek, Tiefenbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/415,984

(22) PCT Filed: Jul. 16, 2013

(86) PCT No.: PCT/EP2013/064967
§ 371 (c)(1),
(2) Date: Jan. 20, 2015

(87) PCT Pub. No.: WO2014/012915
PCT Pub. Date: Jan. 23, 2014

(65) Prior Publication Data
US 2015/0146208 A1    May 28, 2015

(30) Foreign Application Priority Data
Jul. 20, 2012    (DE) ........................ 10 2012 212 785

(51) Int. Cl.
*G01B 11/08*    (2006.01)
*G01B 9/02*    (2006.01)
(Continued)

(52) U.S. Cl.
CPC ............ *G01B 11/08* (2013.01); *G01B 9/0205* (2013.01); *G01B 9/0207* (2013.01);
(Continued)

(58) Field of Classification Search
CPC ......... G01B 11/08; G01B 11/12; G01B 11/10; G01B 11/105; G01N 21/954; G01N 21/9542; G01N 21/9548
See application file for complete search history.

(56) References Cited

U.S. PATENT DOCUMENTS

| | | | |
|---|---|---|---|
| 5,933,237 A * | 8/1999 | Drabarek ............. | G01B 11/303 356/489 |
| 7,643,151 B2 * | 1/2010 | Strahle ................... | G01B 11/12 356/497 |

(Continued)

FOREIGN PATENT DOCUMENTS

| | | |
|---|---|---|
| CN | 101788272 A | 7/2010 |
| DE | 19721843 | 2/1999 |

(Continued)

*Primary Examiner* — Michael A Lyons
*Assistant Examiner* — Violeta A Prieto
(74) *Attorney, Agent, or Firm* — Norton Rose Fullbright US LLP

(57) ABSTRACT

An optical measuring probe for measuring inner and/or outer diameters of objects, uses a first optical element for focusing or collimating an optical beam onto a surface of an object. A second optical element for splitting the optical beam into a first measuring beam and a second measuring beam is provided in the optical measuring probe in such a way that the second measuring beam is guided out of the measuring probe in a direction opposite the direction of the first measuring beam and that the first measuring beam forms a first scan point and the second measuring beam forms a second scan point. Also described is a corresponding method for measuring diameters using the optical measuring probe. The optical measuring probe and the associated method make it possible to optically measure inner and outer diameters of measuring probes objects in a simple manner.

16 Claims, 1 Drawing Sheet

(51) Int. Cl.
*G01B 11/12* (2006.01)
*G01B 11/24* (2006.01)

(52) U.S. Cl.
CPC ............ *G01B 9/0209* (2013.01); *G01B 11/12* (2013.01); *G01B 11/2441* (2013.01)

(56) References Cited

U.S. PATENT DOCUMENTS

| | | | | |
|---|---|---|---|---|
| 8,049,901 | B2* | 11/2011 | Aoki | G01B 11/12 356/241.1 |
| 2008/0259346 | A1* | 10/2008 | Strahle | G01B 11/12 356/496 |
| 2009/0237677 | A1 | 9/2009 | Aoki et al. | |
| 2010/0060904 | A1* | 3/2010 | Keightley | G01B 11/2513 356/608 |
| 2014/0226156 | A1* | 8/2014 | Bergman | G01B 11/12 356/241.1 |

FOREIGN PATENT DOCUMENTS

| | | |
|---|---|---|
| DE | 102007045568 | 4/2009 |
| WO | WO 02/40936 | 5/2002 |
| WO | WO 0240986 | 5/2002 |
| WO | WO 2006032561 | 3/2006 |

\* cited by examiner

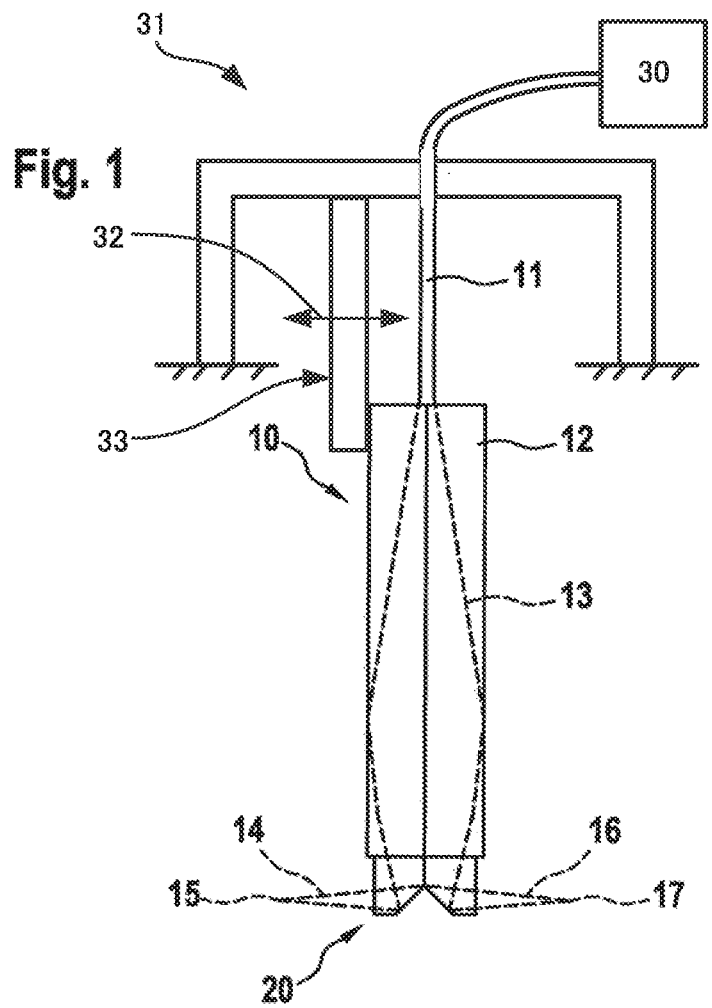
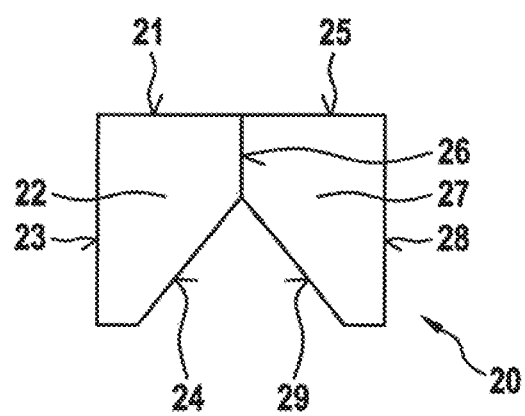

OPTICAL MEASURING PROBE AND METHOD FOR OPTICALLY MEASURING INNER DIAMETERS

FIELD OF THE INVENTION

The present invention relates to an optical measuring probe for measuring inner and/or outer diameters of objects, using a first optical element for focusing or collimating an optical beam onto a surface of an object. The present invention further relates to a method for optically measuring inner and/or outer diameters of objects using a measuring machine and an optical measuring probe, an optical beam from the optical measuring probe being focused onto a surface of the object.

BACKGROUND INFORMATION

Interferometrically operating optical measuring systems including a modulation interferometer and a reference interferometer situated downstream from it are known for the optical detection of the shape, diameter and roughness of surfaces. They are used for optical distance measurement, for example, in quality control during the measurement of surface geometries. EP 1 058 812 B1 describes such an interferometric measuring device for detecting the shape or the distance of in particular rough surfaces, including at least one spatially coherent beam generation unit, whose radiation is split in a measuring probe of the measuring device into a reference measuring beam, which is guided through a measuring reference arm and reflected therein, and a measuring beam, which is guided through a measuring arm and reflected on the rough surface, including a unit for modulating the light phase or for shifting the light frequency according to a heterodyne frequency of a first partial beam in relation to the light phase or the light frequency of a second partial beam, including a superposition unit for superposing the reflected measuring reference beam on the reflected measuring beam, including a beam decomposition and beam reception unit for splitting the superposed radiation into at least two beams having different wavelengths and converting the radiation into electrical signals, and including an evaluation device, in which the shape or the distance of the rough surface is determinable based on a phase difference of the electrical signals. It is provided that the radiation emitted by the beam generation unit is short-coherent and broadband with respect to time, that the beam generation unit, a beam splitter for forming the first and second partial beams, and the unit for phase modulation or frequency shifting are situated in a modular unit, which is spatially spaced apart from the measuring probe and is configured as a modulation interferometer, and that a delay element is situated in the modular unit in the beam path of a partial beam, which results in a difference of the optical path lengths of the two partial beams, which is longer than the coherence length of the radiation emitted by the beam generation unit.

Such interferometric measuring devices, which initially include two interferometers, may be constructed using different types of interferometers. Thus, the modulation interferometer may be constructed as a Mach-Zehnder interferometer, while the measuring interferometer or the measuring probe is constructed compactly, for example, as a Mirau interferometer. The interferometric measuring devices share the feature that a path difference registered in the first interferometer between two partial beams of a short-coherent radiation source is equalized again in the second measuring interferometer or the measuring probe and the partial beams may thus be moved into interference formation. The optical path difference registered by a delay element in EP 1 058 812 B1 may be generated by partial arms of different lengths, through which the partial beams pass, as represented in EP 1 058 812 B1 in a modulation interferometer constructed using optical fibers.

The optical path difference to be registered in the modulation interferometer depends on the structural configuration of the measuring interferometer or the measuring probe.

The publication EP 1 082 580 B1 discusses an interferometric measuring device for detecting the shape, roughness or distance of surfaces, including a modulation interferometer having a spatially coherent beam source and a first beam splitter for splitting its beam into two partial beams, one of which is shifted in its light phase or light frequency with respect to the other with the aid of a modulation device, and subsequently the two partial beams are combined, including a measuring probe in which the combined partial beams are split into a measuring beam guided through a measuring arm and reflected on the surface and a reference beam guided through and reflected in a reference arm, and in which the reflected reference beam is superposed on the reflected measuring beam, and including a receiving unit for splitting the superposed radiation into at least two beams having different wavelengths and converting the radiation into electrical signals, and for evaluating the signals based on a phase difference. It is provided that the modulation interferometer configured as a modular unit is spatially separated from the measuring probe and may be coupled to it via a fiber optic system, and that the measuring arm and the reference arm are formed by one or multiple solid bodies conducting the measuring beam and the reference beam.

The publication DE 197 21 843 C1 discusses an interferometric measuring device for measuring the shape of rough surfaces of a measuring object, having a radiation-generating unit for emitting short-coherent radiation, a first beam splitter for forming a first and a second partial beam, of which the first is directed onto the surface to be measured and the second is directed onto a device having a reflecting element for periodically changing the light path, having a superposition element on which the radiation coming from the measuring surface and the device is made to interfere, and a photodetector device which receives the interfered radiation and sends corresponding electrical signals to a control unit for evaluation. It is provided that the first partial beam is split into at least two additional partial beams with the aid of at least one additional beam splitter, that one of the additional partial beams is guided as a reference partial beam onto a reference mirror situated at a predefined distance from the additional beam splitter, while the at least one other additional partial beam is guided as a measuring partial beam onto a particular measuring point (MP1, MP2) of the measuring object, and that the interference maximums ($E_R$, $E_1$, $E_2$) of the reference partial beam and of the at least one measuring partial beam are separately detectable with the aid of the photodetector device and the control unit. Advantageously, an additional second measuring partial beam is decoupled. By comparing the interference formation of the first measuring partial beam and the reference partial beam with the second partial beam coming from the device, it is possible to obtain a reference point for the first measuring point on the surface of the measuring object. By varying the optical path length in the modulation interferometer, it is possible to shift the scan point of the second measuring partial beam to the second measuring point of the surface of the measuring object. It is thus possible to infer the distance between the two measuring points, for example, the diameter of a drilled hole, from the variation of the optical path length. It is disadvantageous in this case that the measuring zone is limited to the setting possibility of the optical path length in the modulation interferometer, and that a complex beam guidance is required for providing the reference partial beam.

In addition to the described modulation interferometers, further optical, point-measuring scanning systems and measuring methods for determining surface contours and roughnesses are believed to be understood, for example, autofocus sensors, triangulation, chromatic sensors, and white light interferometers.

SUMMARY OF THE INVENTION

An object of the present invention is to provide an optical measuring probe which may be set up as simply as possible for measuring diameters on objects.

A further object of the present invention is to provide a method for operating such an optical measuring probe.

The object of the present invention relating to the optical measuring probe is achieved in that a second optical element for splitting the optical beam into a first measuring beam and a second measuring beam is provided in the optical measuring probe in such a way that the second measuring beam is guided out of the measuring probe in a direction opposite the direction of the first measuring beam and that the first measuring beam forms a first scan point and the second measuring beam forms a second scan point.

The optical measuring probe may be positioned in such a way that in a first measuring position, the first scan point of the first measuring beam lies on a first measuring point of the surface. In a second measuring position, the second scan point of the second measuring beam lies on a second measuring point of the surface. The scan points are positions in which the position of the surface may be established, for example, interferometrically. Since both measuring beams extend in opposite directions, it is possible to determine the distance of the two measuring points on the surface from the distance extending in parallel to the propagation direction of the measuring beams between the first measuring position and the second measuring position if the distance of the two scan points on the surface is known.

The distance of the measuring positions may, for example, be determined via the measured travel of a scanning arm of a coordinate measuring machine or a form measuring machine, or the activation of the actuator of the scanning arm, the optical measuring probe representing a part of the scanning arm. The measurable distance between the measuring points is per se limited by the adjustment travel of the scanning arm. The system makes it possible to measure an inner diameter of a drilled hole and to measure an outer diameter of a measuring object. The orientation of the two measuring beams makes it unnecessary to rotate the measuring probe, which makes it possible to have high precision in a favorable configuration.

The fact that the first measuring beam and the second measuring beam are guided perpendicularly to a mechanical axis of a scanning arm containing the measuring probe makes it possible to determine the diameter of an object, for example, a drilled hole in a workpiece, in a simple manner. The distance of the measuring positions results from the lateral movement of the scanning arm along the direction of propagation of the two measuring beams.

The distance of two exactly diametrically opposed measuring points on the surface of the measuring object may be measured in a simple manner by guiding the first measuring beam and the second measuring beam on a shared straight line in opposite directions.

The first partial beam may be split into the first and the second measuring beam by configuring the second optical element as a prism pair or composing the second optical element of a beam splitter and a downstream mirror. The direction of propagation of the first measuring beam and the second measuring beam is predefined by the orientation of the reflecting surfaces of the prisms or the beam splitter and the mirror. The system including the prisms makes it possible for the first measuring beam and the second measuring beam to be guided on a shared straight line in opposite directions.

Coupling the optical measuring probe to an evaluation unit via an optical fiber results in a compact configuration and simultaneously a freely positionable measuring probe. The measuring probe and the evaluation unit form, for example, an interferometrically operating optical measuring system.

A simple separated optical evaluation of the first measuring beam and the second measuring beam in the evaluation unit may be achieved by configuring the second optical element as a polarizing optical element and polarizing the first measuring beam and the second measuring beam differently. The different polarization planes are separated appropriately for the evaluation.

If it is provided that a distance between the first scan point of the first measuring beam and the second scan point of the second measuring beam is stored in the evaluation unit and/or the evaluation unit is configured for activating an actuator for moving the scanning arm and/or the evaluation unit is connected to a measuring arrangement for determining the distance between the first measuring position and the second measuring position, then all information necessary for determining the distance between the two surfaces is present in the evaluation unit in the form of the distance between the measuring positions and the distance between the scan points. The distance between the measuring positions may be determined alternatively from the activation of the actuator or from a measurement of the travel of the scanning arm.

The object of the present invention relating to the method is achieved in that the optical beam in the optical measuring probe is split into a first measuring beam having a first scan point and into a second measuring beam having a scan point lying diametrically opposed to the first scan point, that in a first step, the optical measuring probe is positioned on a first measuring position in such a way that the first scan point lies on a first surface of the object, that in a second step, the scanning arm is positioned on a second measuring position in such a way that the second scan point lies on a second surface of the object, and that the distance of the surfaces is determined from the distance between the first measuring position and the second measuring position and a calibration distance between the first scan point and the second scan point. The scan points are positions in which the position of the surface may be established optically. The first measuring position is used as a reference point. Based on the above, the scanning arm is moved in the direction of the second surface so far that the second scan point lies on the second surface. It is now possible to infer the distance between the two surfaces from the travel of the measuring probe and consequently of the scanning arm as well as from the device-specific calibration distance between the two scan points. The method makes it possible to precisely measure the inner diameter or the outer diameter of measuring objects. The maximally measurable diameter is only dependent on the maximum travel of the scanning arm.

If it is provided that the first measuring beam and the second measuring beam are guided perpendicularly to a mechanical axis of the scanning arm onto the surface, it is thus possible to precisely determine the travel when the second measuring position is approached.

For determining the distance between the two surfaces, it is necessary to have exact knowledge of the calibration distance as the distance between the two scan points. For precisely determining the calibration distance, it may be provided that the calibration distance between the first scan point and the second scan point is determined in a calibration step on a calibration object having a known shape, and that the calibration distance is stored in an evaluation unit. In the calibration step, the first scan point is initially set to a first surface and subsequently the second scan point is set to a second surface of the calibration object. If the distance of the two surfaces of the calibration object is known, the calibration distance between the two scan points may be determined from the travel necessary for that purpose and stored in the evaluation unit for subsequent measurements.

The present invention will be elucidated in greater detail in the following based on an exemplary embodiment represented in the drawings.

BRIEF DESCRIPTION OF THE DRAWINGS

FIG. 1 shows a schematic representation of an optical measuring probe.

FIG. 2 shows an optical element.

DETAILED DESCRIPTION

FIG. 1 shows an optical measuring probe 10 in a schematic representation. In the shown exemplary embodiment, optical measuring probe 10 is part of an optical measuring device for measuring the inner or outer diameter of an object. Via an optical fiber 11, optical measuring probe 10 is coupled to an evaluation unit 30 of the optical measuring device. An optical beam 13 directed from the evaluation unit via optical fiber 11 to optical measuring probe 10 is focused via a first optical element 12 configured as a gradient-index lens (GRIN lens) and is split by a second optical element 20 in the form of a prism pair into a first measuring beam 14 having a first scan point 15 and into a second measuring beam 16 having a second scan point 17. First optical element 12 focuses first partial beam 13 in both scan points 15, 17.

Optical measuring probe 10 and optical fiber 11 are part of a scanning arm 33 and form a measuring machine 31. Optical measuring probe 10 may thus be positioned spatially diametrically opposed to a surface to be measured.

First measuring beam 14 and second measuring beam 16 are deflected by second optical element 20 in such a way that they exit measuring probe 10 perpendicularly to a mechanical axis of optical measuring probe 10 and consequently of the scanning arm of the form measuring machine. At the same time, measuring beams 14, 16 are oriented in such a way that they extend along a straight line in opposite directions.

The optical measuring device is configured in such a way that it detects a surface when it is located in the focus of a measuring beam 14, 16, i.e., in one of scan points 15, 17. This may be carried out, for example, interferometrically.

For determining a diameter of a measuring object, for example, the measurement of an inner diameter of a drilled hole, the optical measuring device is initially calibrated on a calibration object having a known distance between two diametrically opposed surfaces. At the same time, the distance between scan points 15, 17 is ascertained and stored in the evaluation unit as a calibration distance.

For determining the diameter of the drilled hole, optical measuring probe 10 is positioned in the drilled hole in such a way that first scan point 15 lies on the inner surface of the drilled hole. This first measuring position is stored in the coordinate system of the form measuring machine. Subsequently, the scanning arm and consequently optical measuring probe 10 will be displaced along the straight line (i.e., in direction 32) on which measuring beams 14, 16 lie until second scan point 17 lies on the diametrically opposed surface of the drilled hole. This second measuring position is also stored. It is now possible to determine the diameter of the drilled hole from the two measuring positions and the calibration distance.

FIG. 2 shows second optical element 20 in the form of a prism pair, which was already introduced in FIG. 1. A contact surface 26 aligns a first prism 22 and a second prism 27 in relation to one another. A first beam entrance surface 21, a first beam exit surface 23 and a first reflection surface 24 are provided on first prism 22. Similarly, second prism 27 contains a second beam entrance surface 25, a second beam exit surface 28 and a second reflection surface 29.

Focused optical beam 13 shown in FIG. 1 enters into prisms 22, 27 through beam entrance surfaces 21, 25. A part of optical beam 13 is reflected on first reflection surface 24 and exits first prism 22 as first measuring beam 14 through first beam exit surface 23. Another part of optical beam 13 is reflected on second reflection surface 29 and exits second prism 27 as second measuring beam 16 through second beam exit surface 28. The positioning of prisms 22, 27 and reflection surfaces 24, 29 has the result that measuring beams 14, 16 exit optical measuring probe 10 in an opposite direction perpendicularly to a mechanical axis of optical measuring probe 10. As a result, two diametrically situated scan points 15, 17 are formed, which lie on a straight line and are oriented perpendicularly to the mechanical axis of optical measuring probe 10 and consequently of the scanning arm. Measuring beams 14, 16, which are reflected back by a surface of the measuring object, are guided back to first optical element 12 shown in FIG. 1 and optical fiber 11 via particular beam exit surfaces 23, 28, particular reflection surfaces 24, 29 and particular beam entrance surfaces 21, 25.

What is claimed is:

1. An optical measuring probe for measuring inner diameters of objects, comprising:
   an optical measuring probe arrangement, including:
   a first optical element for focusing or collimating an optical beam onto a surface of an object; and
   a second optical element for splitting the optical beam exclusively into a first measuring beam and a second measuring beam is situated and provided in the optical measuring probe arrangement so that the first measuring beam and the second measuring beam are guided out of the measuring probe in opposite directions on a common straight line and the first measuring beam forms a first scan point and the second measuring beam forms a second scan point;
   wherein the measuring probe is positionable for determining the inner diameter in such a way that in a first measuring position the first scan point of the first measuring beam lies on a first measuring point of an object surface forming the inner diameter,
   wherein, following a lateral movement of the measuring probe along a propagation direction of the two measuring beams, in a second measuring position, the second scan point of the second measuring beam lies on a second measuring point of the object surface forming the inner diameter, wherein a distance between the first scan point and second scan point is known;

wherein a distance between the first measuring position and the second measuring position is determined, and wherein the inner diameter is determined based on the known distance between the first scan point and second scan point and the determined distance between the first measuring position and the second measuring position.

2. The optical measuring probe of claim 1, wherein the second optical element is configured as a prism pair.

3. The optical measuring probe of claim 1, wherein the optical measuring probe is coupled to an evaluation unit via an optical fiber.

4. The optical measuring probe of claim 1, wherein the second optical element is configured as a polarizing optical element and the first measuring beam and the second measuring beam are polarized differently.

5. The optical measuring probe of claim 1, wherein the optical measuring probe determines the inner diameter of an object based on a calibration distance between the first scan point of the first measuring beam and the second scan point of the second measuring beam stored in an evaluation unit, and wherein a distance between the first measuring position and the second measuring position is determined from the evaluation unit.

6. A method for optically measuring inner diameters of objects using an interferometrically operating measuring system, the method comprising:

focusing an optical beam from an optical measuring probe onto a surface of the object, wherein the optical beam in the optical measuring probe is split exclusively into a first measuring beam having a first scan point and into a second measuring beam having a second scan point, the first measuring beam and the second measuring beam being guided out of the measuring probe in opposite directions on a common straight line;

positioning the optical measuring probe on a first measuring position so that the first scan point lies on a first surface of the object forming the inner diameter;

positioning the optical measuring probe on a second measuring position so that the second scan point lies on a second surface of the object forming the inner diameter;

moving the optical measuring probe along a propagation direction of the two measuring beams; and determining a distance between the first surface and the second surface from a distance between the first measuring position and the second measuring position and a calibration distance between the first scan point and the second scan point.

7. The method of claim 6, wherein the first measuring beam and the second measuring beam are guided onto the surfaces perpendicularly to a mechanical axis of the scanning arm having the optical measuring probe.

8. The method of claim 6, wherein the calibration distance between the first scan point and the second scan point is determined in a calibration task on a calibration object having a known shape, and the calibration distance is stored in an evaluation unit.

9. The method of claim 7, wherein the calibration distance between the first scan point and the second scan point is determined in a calibration task on a calibration object having a known shape, and the calibration distance is stored in an evaluation unit.

10. The optical measuring probe of claim 1, wherein the first measuring beam and the second measuring beam are guided on a shared straight line in opposite directions, and wherein the second optical element is configured as a prism pair or the second optical element includes a beam splitter.

11. The optical measuring probe of claim 10, wherein the first measuring beam and the second measuring beam are polarized differently.

12. The optical measuring probe of claim 10, wherein the optical measuring probe determines the inner diameter of an object based on a calibration distance between the first scan point of the first measuring beam and the second scan point of the second measuring beam, and wherein a distance between the first measuring position and the second measuring position is determined.

13. An interferometrically operating measuring system for measuring inner diameters of objects, comprising:

an optical measuring probe, the measuring probe including:

a first optical element for focusing or collimating an optical beam onto a surface of an object; and a second optical element for splitting the optical beam exclusively into a first measuring beam and a second measuring beam is situated and provided in the optical measuring probe arrangement so that the first measuring beam and the second measuring beam are guided out of the measuring probe in opposite directions on a common straight line and the first measuring beam forms a first scan point and the second measuring beam forms a second scan point;

wherein the measuring probe is positionable for determining of the inner diameter in such a way that in a first measuring position the first scan point of the first measuring beam lies on a first measuring point of an object surface forming the inner diameter, and wherein, following a lateral movement of the measuring probe along a propagation direction of the two measuring beams, in a second measuring position, the second scan point of the second measuring beam lies on a second measuring point of the object surface forming the inner diameter; and a measuring machine having a scanning arm, the optical measuring probe being part of the scanning arm;

wherein the two measuring beams of the optical measuring probe are guided out of the optical measuring probe perpendicularly to a mechanical axis of the scanning arm, and wherein the scanning arm is positionable in a first position and a second position by a lateral movement along the propagation direction of the two measuring beams.

14. The system of claim 13, wherein a distance between the first scan point and second scan point is known, wherein a distance between the first measuring position and the second measuring position is determined, and wherein the inner diameter is determined based on the known distance between the first scan point and second scan point and the determined distance between the first measuring position and the second measuring position.

15. The system of claim 13, wherein the optical measuring probe is coupled to an evaluation unit via an optical fiber.

16. The system of claim 15, wherein at least one of the following is satisfied: i) a distance between the first scan point of the first measuring beam and the second scan point of the second measuring beam is stored in the evaluation unit; ii) the evaluation unit controls an actuator, the actuator configured to move the scanning arm; and iii) the evaluation unit is connected to a measuring means for determining a distance between the first measuring position and the second measuring position.

* * * * *